United States Patent [19]
Tamura

[11] Patent Number: 4,712,187
[45] Date of Patent: Dec. 8, 1987

[54] AUTOMATIC CENTERING METHOD FOR A VIDEO CAMERA

[75] Inventor: Eiji Tamura, Kanagawa, Japan

[73] Assignee: Sony Corporation, Tokyo, Japan

[21] Appl. No.: 723,288

[22] Filed: Apr. 15, 1985

[30] Foreign Application Priority Data

Apr. 16, 1984 [JP] Japan .................................. 59-76278

[51] Int. Cl.⁴ ........................ G01C 25/00; H04N 9/09
[52] U.S. Cl. ........................................ 364/571; 358/51
[58] Field of Search ..................... 364/571; 358/51, 44; 368/115

[56] References Cited

U.S. PATENT DOCUMENTS

| | | | |
|---|---|---|---|
| 3,609,219 | 9/1971 | Diehl ...................................... | 358/51 |
| 3,925,812 | 12/1975 | Blom et al. ............................ | 358/51 |
| 4,234,890 | 11/1980 | Astle et al. ......................... | 358/51 X |
| 4,249,197 | 2/1981 | van Spaandonk et al. ........ | 358/41 X |
| 4,320,414 | 3/1982 | Miyaji et al. ........................... | 358/51 |
| 4,424,447 | 1/1984 | Lelong et al. .................... | 364/571 X |
| 4,455,569 | 6/1984 | Takahashi et al. .................... | 358/51 |
| 4,499,488 | 2/1985 | White et al. ........................... | 358/51 |
| 4,506,287 | 3/1985 | Yamanaka et al. ................ | 358/51 X |
| 4,507,678 | 3/1985 | Iwabe et al. ........................... | 358/51 |
| 4,544,952 | 10/1985 | Pham van Cang ............... | 358/51 X |
| 4,553,164 | 11/1985 | Labb ................................. | 358/51 X |
| 4,556,074 | 1/1986 | Nishikawa .......................... | 364/571 |
| 4,608,593 | 8/1986 | Miyaji et al. ....................... | 358/41 X |
| 4,622,581 | 11/1986 | Kihara et al. .......................... | 358/51 |

*Primary Examiner*—Errol A. Krass
*Assistant Examiner*—Joseph L. Dixon
*Attorney, Agent, or Firm*—Eslinger, Lewis H.; Alvin Sinderbrand

[57] ABSTRACT

An automatic centering method for a video camera having a plurality of pick-up tubes and a deflection control circuit for each of the plurality of pick-up tubes is disclosed, which includes the steps of comparing outputs of two pick-up tubes of the plurality of pick-up tubes to thereby generate an error signal, processing the error signal to thereby generate a control signal, supplying the control signal to the deflection control circuit for one of the two pick-up tubes, storing the control signal in a memory, changing the control signal supplied to the deflection control circuit by a predetermined amount, repeating the above-described first to third steps, comparing the control signal generated in the sixth step and the control signal in the memory with each other to thereby generate an error flag signal when the above two control signals do not coincide with each other and indicating the error flag signal.

4 Claims, 12 Drawing Figures

FIG. 4A
FIG. 4B
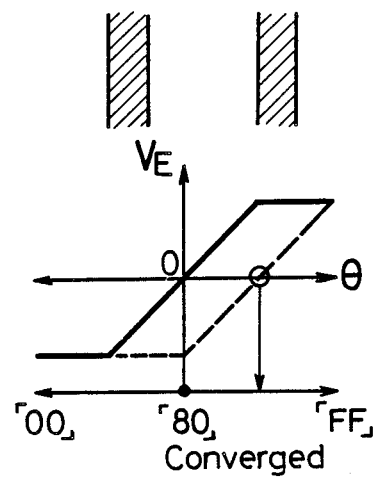
FIG. 5A
FIG. 5B
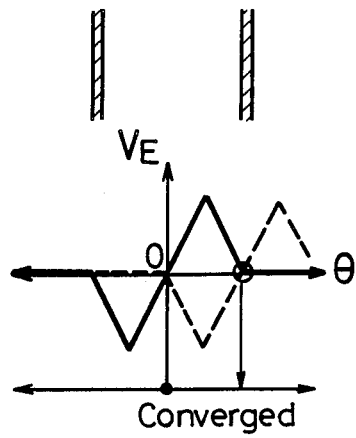
FIG. 6A
FIG. 6B
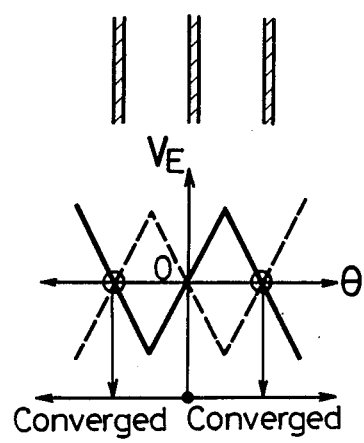

FIG. 7

```
CENT      NG
OBJECT    ?
TRY   AGAIN
```

FIG. 8

| A D |
| R F |
| △ |
| MA01 |
| MA02 |
| MA03 |
| MA04 |
| MAOSAVE |
| 1st FLG |

AUTOMATIC CENTERING METHOD FOR A VIDEO CAMERA

BACKGROUND OF THE INVENTION

1. Field of the Invention

This invention relates generally to an automatic centering method for a video camera having a plurality of pick-up tubes and, in particular, is directed to an automatic centering method suitable for use with a three pick-up tube type video camera by which the centers of picture screens of three pick-up tubes can automatically be made coincident with one another.

2. Description of the Prior Art

In the prior art, when the centering of a video camera of, for example, the three pick-up type is carried out, a predetermined test chart such as a stripe pattern and so on is picked up by the pick-up tubes and while the pictures shot by the pick-up tubes are checked by a television monitor and so on, the deflection systems and the like of the respective pick-up tubes are adjusted.

Such a prior art centering method, however, always requires the test chart and, the deflection system and so on must be adjusted very skillfully.

On the other hand, as is disclosed in a Japanese patent application No. 175427/1983 previously proposed by the present applicant, it was considered that an arbitrary object be shot by a pick-up tube and the centering thereof be carried out automatically by using a microcomputer.

In this case, however, it became clear that depending on the content of the object, the centering was not carried out correctly but the displacement among the centerings was increased.

That is, as shown in FIGS. 2A and 2B, when objects which are the same in displacement amount (shown by an arrow) but different ones are shot or picked up, in the case of FIG. 2A, the objects are converged to the nearby pattern (shown by a double arrow) to thereby establish the correct centering, while the case of FIG. 2B, when the objects are converged to the nearby pattern (shown by the double arrow), the displacement amount of the centerings is increased, on the contrary.

Accordingly, if a picture is taken by the video camera with the displaced centering, it becomes impossible to reproduce the picture correctly. As a result, the pictures taken by the video camera become useless.

OBJECTS AND SUMMARY OF THE INVENTION

Accordingly, it is an object of this invention to provide an automatic centering method for a video camera having a plurality of pick-up tubes by which centers of the picture screens thereof can be made coincident with each other automatically.

It is another object of this invention to provide an automatic centering method for a video camera having a plurality of pick-up tubes which can prevent a picture from being shot with an incorrect centering state.

According to an aspect of this invention, there is provided an automatic centering method for a video camera having a plurality of pick-up tubes and a deflection control circuit for each of said plurality of pick-up tubes comprising the steps of:

(A) comparing outputs of two pick-up tubes of said plurality of pick-up tubes to thereby generate an error signal;
(B) processing said error signal to thereby generate a control signal;
(C) supplying said control signal to said deflection control circuit for one of said two pick-up tubes;
(D) storing said control signal in a memory;
(E) changing said control signal supplied to said deflection control circuit by a predetermined amount;
(F) repeating the above-described steps (A) to (C);
(G) comparing said control signal generated in said step (F) and said control signal in said memory with each other to thereby generate an error flag signal when said control signals do not coincide with each other; and
(H) indicating said error flag signal.

These and other objects, features and advantages of the present invention will become apparent from the following detailed description of the preferred embodiment taken in conjunction with the accompanying drawings, throughout which like reference numerals designate like elements and parts.

BRIEF DESCRIPTION IN THE DRAWINGS

FIGS. 4A, 4B, FIGS. 5A, 5B and FIGS. 6A, 6B are respectively diagrams useful for explaining the flow chart of FIG. 3;

FIG. 7 is a diagram of an example of a picture displayed on a picture screen of a display apparatus useful for explaining this invention; and FIG. 8 is a diagram showing an example of a memory area of a microcomputer used in this invention.

DESCRIPTION OF THE PREFERRED EMBODIMENT

Figure 1:
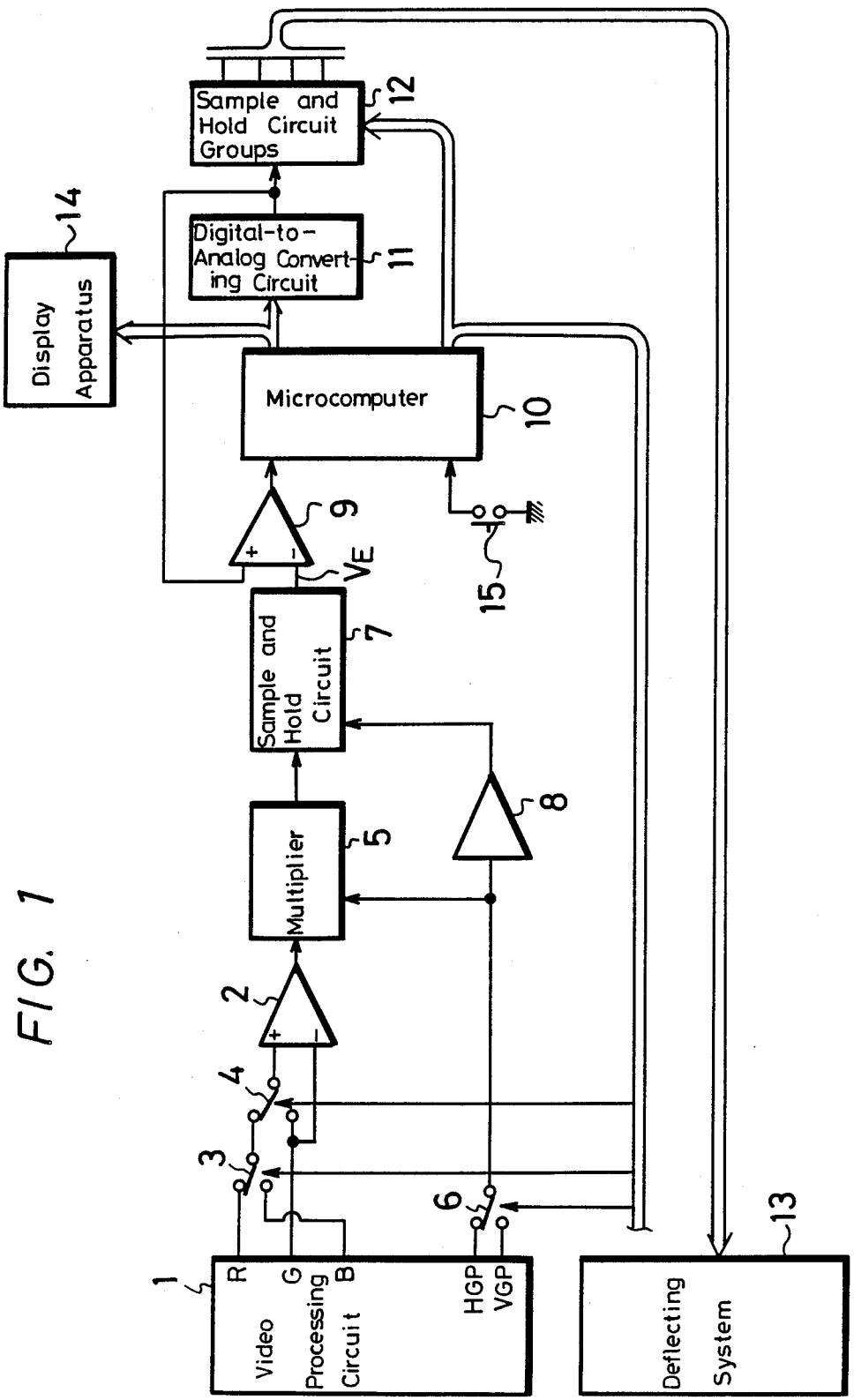
FIG. 1 is a block diagram showing an example of an automatic centering apparatus which is used to carry out an embodiment of the automatic centering method for a video camera according to this invention.

FIG. 1 is a block diagram schematically showing an example of the automatic centering apparatus for a video camera which can carry out an embodiment of the automatic centering method for a video camera according to this invention.

In FIG. 1, reference numeral 1 designated a video processing circuit which delivers therefrom red (R), green (G) and blue (B) video signals from, for example, three pick-up tubes (not shown) and which produces edge signals (differentiation signals) $H_{GP}$ and $V_{GP}$ of horizontal and vertical directions of a picture image of, for example, green color which is taken as a reference in the centering.

The reference green video signal from the video processing circuit 1 is supplied to an inverted input terminal of a differential amplifier 2 and the red and blue video signals R and B from this video processing circuit 1 are selected by a switch 3. Further, the selected signal R or B and the green video signal G are selected by a switch 4 and then the selected video signal is fed to a non-inverting input terminal of the differential amplifier 2.

The output signal of the differential amplifier 2 is supplied to a multiplier 5 and the edge signals $H_{GP}$ and $V_{GP}$ from the video processing circuit 1 are selected by a switch 6 and then the selected signal is fed to the multiplying circuit 5.

The output signal from this multiplying circuit 5 is supplied to a sample and hold circuit 7 and the selected signal from the switch 6 is supplied through a full-wave rectifying circuit 8 to the sampling terminal of the sample and hold circuit 7.

The output signal (potential $V_E$) of the sample and hold circuit 7 is supplied to a negative input terminal of a potential comparing circuit 9.

An output data of a microcomputer 10 is supplied to a D/A (digital-to-analog)-converting circuit 11 and an analog signal (potential) thus converted by the D/A-converting circuit 11 is supplied to the positive input terminal of the voltage comparing circuit 9. As a result, when the inputs applied to the positive and negative input terminals of the comparing circuit 9 coincide with each other, the output signal from the comparing circuit 9 is supplied to the microcomputer 10 in which the output data from the comparing circuit 9 is latched as a digital value of the potential $V_E$.

Further, the output signal from the D/A-converting circuit 11 is supplied to a plurality of sample and hold circuit groups 12 and these sample and hold circuit groups 12 are operated by the control signal from the microcomputer 10 to thereby hold therein respective desired potentials.

The held potentials in the sample and hold circuit groups 12 are supplied to a deflecting system 13 of the three pick-up tubes (not shown).

The switches 3, 4 and 6 are respectively controlled by the control signal from the microcomputer 10. The output data from the microcomputer 10 is supplied to a display apparatus 14.

A switch 15 is connected to a starting terminal of the microcomputer 10 and when this switch 15 is depressed or turned on, the microcomputer 10 starts its automatic centering mode.

Figure 3:
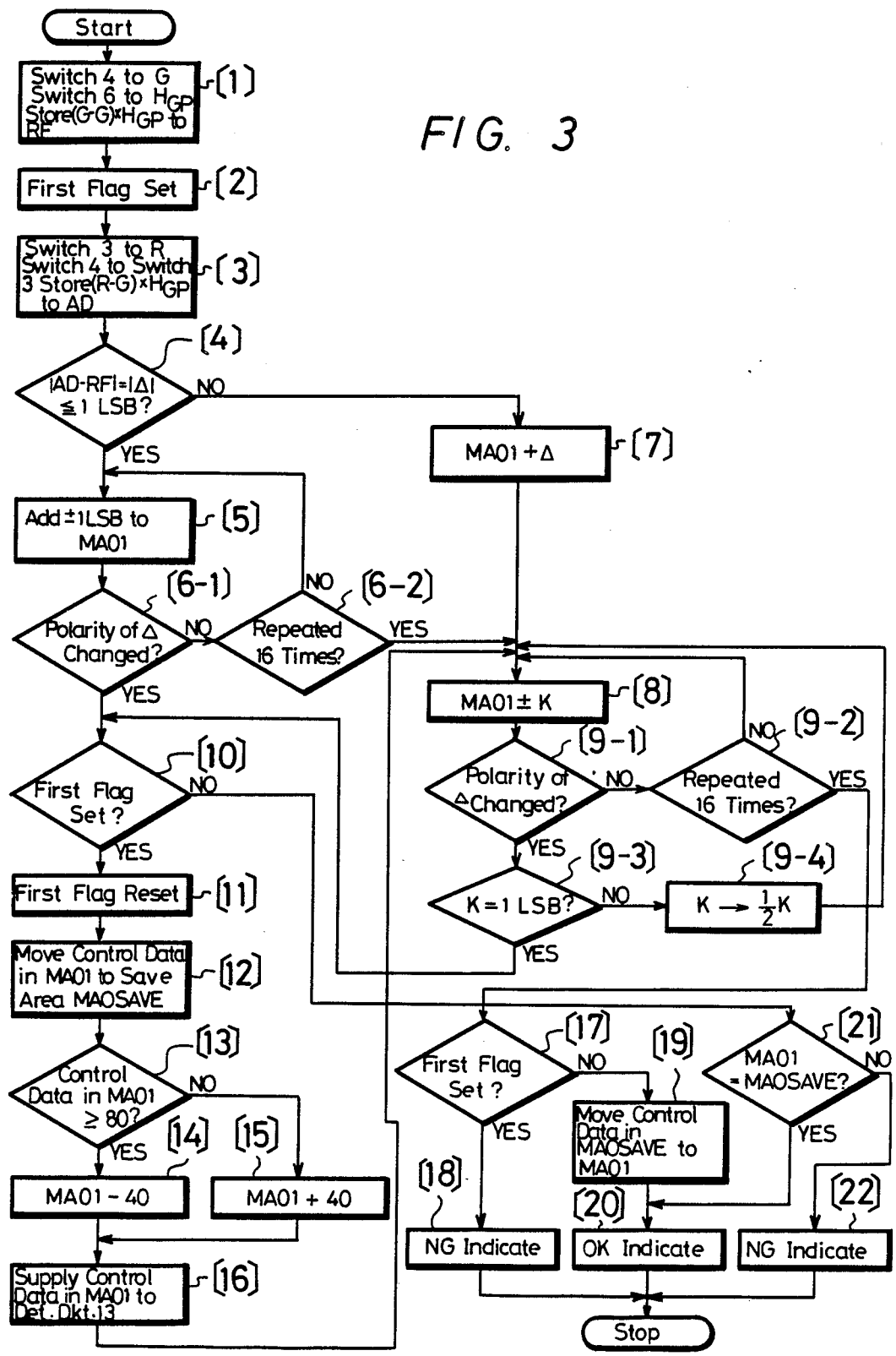
FIG. 3 is a flow chart useful for explaining the operation of the automatic centering apparatus of FIG. 1.

FIG. 3 illustrates a flow chart of the software stored in the microcomputer 10. The flow chart of FIG. 3 is for the case where the position of the red picture in the horizontal direction is made coincident with the reference green picture, but the cases where the position of the red picture in the vertical direction and positions of the blue picture in the horizontal and vertical directions are made coincident with the reference green picture are substantially similar to that of FIG. 3. In the initial state, in the memory (random access memory) of the microcomputer 10, there is stored a value corresponding to a standard deflection position in the horizontal (H) and vertical (V) directions of the red (R) and blue (B) pictures, for example, a value "80" if the memory is an 8-bit memory which can take values from "00" to "FF". This value "80" is produced from the microcomputer 10 and then fed to the deflecting system 13.

Referring to FIG. 3, when the centering operation is started, in step 1, the switch 4 is changed in position to the side of the green video signal G and the switch 6 is changed in position to the side of the edge signal $H_{GP}$ respectively so that the potential $V_E$ produced from the voltage comparing circuit 9 is expressed as $$V_E = (G-G) \times H_{GP}$$

Then, this potential $V_E$ is A/D (analog-to-digital)-converted and then written in a reference potential memory area (RF) of the microcomputer 10 (refer to FIG. 8).

In next step 2, a flag (1st FLG) indicative of the first processing of the centering operation is written or set in the memory area of the microcomputer 10.

In the following step 3, the switch 3 is changed in position to the side of the red video signal R and the switch 4 is changed in position to the side of the switch 3 respectively so that the potential $V_E$ from the voltage comparing circuit 9 is expressed as $$V_E = (R-G) \times H_{GP}$$

Then, this potential $V_E$ is A/D-converted similarly as mentioned above and then stored in a compared input memory area (AD) of the microcomputer 10.

The potential stored in the memory area (AD) of the microcomputer 10 corresponds to the phase displacement (centering displacement) between, for example, the green and red video signals G and R and has the characteristic in accordance with the state of objects as shown in FIGS. 4A, 4B to FIGS. 6A, 6B.

That is, when the content of the object is of such a pattern that longitudinal stripes of enough width are arranged with a proper spacing or distance between adjacent ones as shown in FIG. 4A, the potential is changed monotonically as shown in FIG. 4B. In this case, when the potential becomes equal to "0" (=value of RF), the condition in which centering has been exactly performed is established.

On the other hand, when the width of each of the longitudinal stripes is small as shown in FIG. 5A, the potential is changed in the form of substantially S-shape as shown in FIG. 5B so that the both sides of the potential become equal to "0". In this case, AD="0" at the center of the S-shape indicates the correct centering position and the both sides thereof indicate the incorrect centering positions.

Figure 2A:
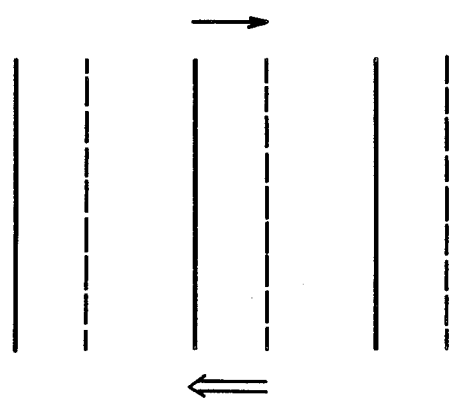
FIGS. 2A and 2B are respectively diagrams useful for explaining the effect of this invention.
Figure 2B:
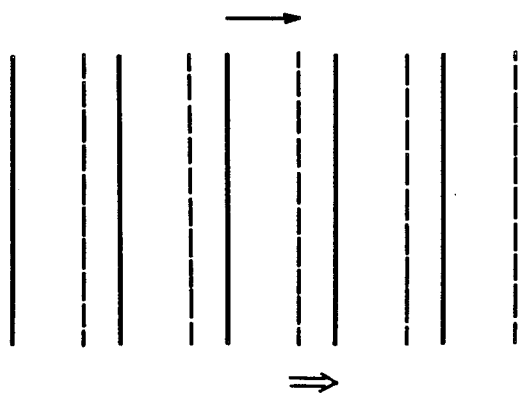

When the width of each of the stripes is narrow and the distance between the adjacent strips is also narrow as shown in FIG. 6A, the potential is changed in the form of a triangular wave shape a shown in FIG. 6B. In this case, AD="0" is established at two places, in which one indicates the correct centering position, while the other indicates a case in which the object is focussed at the opposite side as shown in FIG. 2B.

Therefore, in step 4, it is judged whether a value expressed as $(AD)-(RF)=\Delta$ is larger than or smaller than 1 LSB (least significant bit) or not $(|AD|-|RF|)=|\Delta| \leq 1$ LSB. This value $\Delta$ is utilized as error data.

In step 4, if it is judged that $\Delta \leq \pm 1$ LSB is established, in next step 5, $\pm 1$ LSB is added to the data stored in the memory area (MA01) corresponding to the horizontal deflection position of the red picture in accordance with the polarity of $\Delta$ and this data is once again stored in the memory area (MA01). Then, the value or data of the memory area (MA01) is delivered from the microcomputer 10 to the deflecting system 13. Further, the potential $V_E$ at this time is latched in the microcomputer 10 and the above-described operations are repeated in turn.

In next step 6-1, if it is judged that the polarity of $\Delta$ is changed, the processing step proceeds to step 10. While, when in step 6-1 it is judged that the polarity of $\Delta$ is not changed, the processing step proceeds to step 6-2 in which 1 LSB is added to the data in the same direction. This adding operation is continued until it is judged the this operation has been carried out 16 times in step 6-2. In step 6-2, if it is judged that the operation has been carried out 16 times, the processing proceeds to step 8.

In step 4, if it is judged that $\Delta > \pm 1$ is established, the step proceeds to step 7 in which the value $\Delta$ is subtracted from the data of the memory area (MA01) of the microcomputer 10 and the subtracted value is delivered from the microcomputer 10 to the deflecting system 13.

Then, the step 7 proceeds to step 8. In step 8, a reference correcting data $\pm k$ (k is an arbitrary interger) is added to the data of the memory area (MA01) in accordance with the polarity of $\Delta$. The resultant data is returned to the memory area (MA01) of the microcomputer 10, and the value or data of the memory area (MA01) is delivered from the microcomputer 10 to the deflecting system 13. At this time, the potential $V_E$ is latched in the memory area (MA01) and this operation is carried out sequentially.

In next step 9-1, it is judged whether the polarity of $\Delta$ is changed or not. If it is judged that the polarity of $\Delta$ is changed, the processing step proceeds to step 9-3. In step 9-3, it is judged whether k=1 LSB is established or not. If it is judged that k=1 LSB is not established, the processing step proceeds to step 9-4 in which the same operation is carried out with $\pm\frac{1}{2}k$ instead of $\pm k$.

In step 9-1, if it is judged that the polarity of $\Delta$ is not changed, the same addition processing of k is repeated. Then, in next step 9-2, if it is judged that the polarity of $\Delta$ is not changed after the above-described operation is carried out 16 times, the processing step proceeds to step 17.

As described above, if in step 6-1 it is judged that the polarity of $\Delta$ is changed, the processing step proceeds to step 10. In step 10, it is judged whether the first flag is set in the memory area (1st FLG) of the microcomputer 10 or not. If the flag is set in the memory area, the processing step proceeds to step 11. In step 11, the flag for the memory area (1st FLG) of the microcomputer 10 is reset.

Further, in next step 12, the value of the memory area (MA01) is stored in the memory save area (MA0SAVE) of the microcomputer 10.

In next step 13, it is judged whether the value stored in the memory area (MA01) is larger than "80" or not. If it is larger than "80", the step proceeds to step 14, in which "40" is subtracted from the data stored in the memory area (MA01). If not, the processing step proceeds to step 15 in which "40" is added to the data stored in the memory area (MA01) and the resultant data is once again returned to the memory area (MA01) of the microcomputer 10.

After the addition and subtraction as mentioned above, in next step 16, the value of data stored in the memory area (MA01) is delivered to the deflecting system 13. Thereafter, the processing step is returned to step 8.

Thereby, from the state that the convergence of the first centering is carried out, the convergence operation of step 8 once again begins with the position at which the adjustment range of the centering is displaced by one half.

As set forth above, in step 9-2, if it is judged that the polarity of $\Delta$ is not changed after the same operation is carried out 16 times, the processing step proceeds to step 17. In step 17, it is judged whether the flag (1st FLG) is written in the memory area of the microcomputer 10 or not.

In step 17, if it is judged that the flag is written therein, the convergence of the centering is not completed by the first operation so that "NG" is indicated on the picture screen of the display apparatus 14 in next step 18 and the convergence operation is stopped.

If the flag is reset, it is judged that the state of the centering is as shown in FIGS. 4A and 4B or FIGS. 5A and 5B so that in next step 19, the data of the memory area (MA0SAVE) is written in the memory area (MA01) of the microcomputer 10. Then, the data stored in the memory area (MA01) is delivered from the microcomputer 10 to the deflecting system 13.

Then, in next step 20, "OK" is indicated on the picture screen of the display apparatus 14 and the convergence operation is stopped.

Further, as described above, in step 9-3, if it is judged that k=1 LSB is established, the processing step proceeds to step 10. In step 10, since the first flag (1st FLG) is reset, the processing step proceeds to step 21. In step 21, it is judged whether the data stored in the memory area (MA0SAVE) coincide with each other or not.

If they are coincident with each other, the processing step proceeds to step 20, in which "OK" is indicated on the picture screen of the picture display apparatus 14.

If not, this is regarded as the state shown in FIGS. 6A and 6B and in next step 22, "NG" is indicated on the picture screen of the display apparatus 14 and the convergence operation is ceased.

As described above, the adjustment of the centering is carried out. According to the automatic centering method of this invention, when the object is inappropriate as shown in FIGS. 6A and 6B, even if the convergence operation is carried out, "NG" is indicated on the picture screen of the display apparatus 14. Thus, there is no fear that the picture will be taken uselessly by the video camera with incorrect centering.

In this case, when the contents of the object are changed by a so-called zoom-up technique or the like, the correct centering can be made. Therefore, in the indication of step 22, as, for example, shown in FIG. 7, in addition to "CENT NG", "OBJECT ?", "TRY AGAIN" and so on are indicated on the picture screen of the display apparatus 14, while only "CENT NG" is indicated in step 18.

While in the above operation the position of the red color picture in the horizontal direction is made coincident with the reference green color picture, the position of the red color picture in the vertical direction and positions of the blue color picture in the horizontal and vertical directions can be made coincident with the reference green color picture by substantially similar manner. In that case, as shown in FIG. 8, if in addition to the memory area (MA01), other memory areas (MA01) to (MA04) are respectively provided in the microcomputer 10 and in steps 1 and 3 shown in the flow chart of FIG. 3, the switch 6 is changed in position to the side of the edge signal $V_{GP}$ or the switch 3 is changed in position to the side of the blue video signal B, the convergence of each centering of these can be carried out. Also in these cases, even if the convergence operation of the centering is carried out with the inappropriate object similar to that mentioned above, the "NG" indication for such inappropriate object can be carried out.

As set forth above, according to this invention, it becomes possible to positvely prevent the picture from being taken by the video camera under the state that the centering thereof is incorrect.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:

1. An automatic centering method for a video camera having a plurality of pick-up means producing respective outputs and respective deflection control circuit for each of said pick-up means for causing a deflection of the respective pick-up means within a predetermined centering range in response to a respective control signal, said method preventing completion of a centering operation to an erroneous centered position within said centering range, comprising the steps of:

comparing the outputs of first and second ones of said pick-up means to generate an error signal indicative of a centering deviation between said first and second pick-up means;

processing said error signal to generate a control signal for said first pick-up means so as to minimize said centering deviation;

supplying the generated control signal to said deflection control circuit for said first pick-up means so that said first pick-up means is deflected to a centered position in said centering range;

storing said generated control signal in a memory;

changing said generated control signal supplied to said deflection control circuit for said first pick-up means by a predetermined amount so that said first pick-up means is deflected to a second position in said centering range remote from said centered position;

repeating the above-described steps of comparing, processing and supplying to generate a new control signal minimizing centering deviation and to supply the same to said deflection control circuit for said first pick-up means;

comparing said new generated control signal with said control signal stored in said memory to generate an error flag signal when the compared control signals do not coincide with each other; and indicating said error flag signal.

2. An automatic centering method according to claim 1, wherein said processing step includes the steps of multiplying said error signal by edge information of the output from said second pick-up means and analog-to-digital-converting said multiplied signal to generate error data.

3. An automatic centering method according to claim 2, wherein said processing step further includes the steps of repeatedly combining reference correcting data generated from said error data with an intermediately generated control signal to generate a corrected control signal and decreasing an absolute value of said reference correcting data when said error data changes its polarity.

4. An automatic centering method according to claim 3, wherein said decreasing step decreases said absolute value of said reference correcting data by one half.

* * * * *